United States Patent
Bichot et al.

(10) Patent No.: US 7,680,911 B1
(45) Date of Patent: Mar. 16, 2010

(54) METHOD FOR MANAGING OBJECTS IN A COMMUNICATION NETWORK AND IMPLEMENTING DEVICE

(75) Inventors: Guillaume Bichot, La Chapelle Chaussee (FR); Helmut Buerklin, Rennes (FR); Fabienne Coez, Wambrechies (FR); Patrick Pirat, Ercé près Liffré (FR); Gilles Straub, Acigné (FR)

(73) Assignee: Thomson Licensing, Boulogne Billancourt (FR)

( * ) Notice: Subject to any disclaimer, the term of this patent is extended or adjusted under 35 U.S.C. 154(b) by 0 days.

(21) Appl. No.: 09/673,897

(22) PCT Filed: Apr. 21, 1999

(86) PCT No.: PCT/FR99/00943

§ 371 (c)(1),
(2), (4) Date: Jan. 5, 2001

(87) PCT Pub. No.: WO99/56435

PCT Pub. Date: Nov. 4, 1999

(30) Foreign Application Priority Data

Apr. 23, 1998 (FR) .................................. 98 05110

(51) Int. Cl.
*G06F 15/173* (2006.01)
*G06F 9/44* (2006.01)
(52) U.S. Cl. ........................ 709/223; 709/217; 709/219; 719/313
(58) Field of Classification Search ................... 709/310, 709/313, 316, 221–224, 217, 219, 225, 226, 709/229; 719/310–316; 710/8, 72, 104; 370/257
See application file for complete search history.

(56) References Cited

U.S. PATENT DOCUMENTS

| 4,914,571 | A |   | 4/1990 | Baratze et al. ............... 364/200 |
| 5,384,697 | A |   | 1/1995 | Pascucci ..................... 364/139 |
| 5,491,796 | A | * | 2/1996 | Wanderer et al. ........... 709/224 |
| 5,511,208 | A | * | 4/1996 | Boyles et al. ............... 709/223 |

(Continued)

FOREIGN PATENT DOCUMENTS

EP         0315158         5/1989

(Continued)

OTHER PUBLICATIONS

Corcoran "Mapping Home-Network Appliances to TCP/IP Sockets Using a Three-Tiered Home Gateway Architecture" 1998 IEEE, pp. 729-736.*

(Continued)

*Primary Examiner*—Van H Nguyen
(74) *Attorney, Agent, or Firm*—Robert D. Shedd; Paul P. Kiel

(57) ABSTRACT

A method for distributed management of a catalogue of objects in a communication network comprising devices. The method comprises the step of registering local objects present in a device in a local registry managed at the level of the device, wherein a local object may formulate a request for a list of objects, and receive a collected response. The request is transmitted to the single local registry of the device hosting the local object and propagated through the local registry to distant registries. The responses are collected by the local registry and the collected response is transmitted to the local object that formulated the initial request. The invention applies in particular within the context of home communication networks.

10 Claims, 3 Drawing Sheets

U.S. PATENT DOCUMENTS

| | | | | |
|---|---|---|---|---|
| 5,721,825 | A * | 2/1998 | Lawson et al. | 709/203 |
| 5,828,842 | A * | 10/1998 | Sugauchi et al. | 709/223 |
| 5,959,536 | A * | 9/1999 | Chambers et al. | 710/104 |
| 6,032,202 | A * | 2/2000 | Lea et al. | 710/8 |
| 6,038,625 | A * | 3/2000 | Ogino et al. | 710/104 |
| 6,049,838 | A * | 4/2000 | Miller et al. | 719/315 |
| 6,052,750 | A * | 4/2000 | Lea | 710/72 |
| 6,085,236 | A * | 7/2000 | Lea | 709/220 |
| 6,160,796 | A * | 12/2000 | Zou | 370/257 |
| 6,185,613 | B1 * | 2/2001 | Lawson et al. | 709/224 |
| 6,349,352 | B1 * | 2/2002 | Lea | 710/72 |
| 6,353,765 | B1 * | 3/2002 | Shinotsuka | 700/8 |
| 6,507,875 | B1 * | 1/2003 | Mellen-Garnett et al. | 709/310 |
| 6,523,696 | B1 * | 2/2003 | Saito et al. | 709/223 |

FOREIGN PATENT DOCUMENTS

| | | |
|---|---|---|
| EP | 0524036 | 1/1993 |
| EP | 0618708 | 10/1994 |
| EP | 0658010 | 6/1995 |

OTHER PUBLICATIONS

Corcoran et al. "User Interface Technologies for Home Appliances and Networks" 1998 IEEE, pp. 679-685.*

* cited by examiner

METHOD FOR MANAGING OBJECTS IN A COMMUNICATION NETWORK AND IMPLEMENTING DEVICE

This application claims the benefit, under 35 U.S.C. §365 of International Application PCT/FR99/00943 filed Apr. 21, 1999, which claims the benefit of French Patent Application No. 9805110, filed Apr. 23, 1998.

BACKGROUND OF THE INVENTION (1) Field of the Invention

The invention relates to a process for managing objects, in particular software modules, in a communication network which may be of the home-automation type. It also relates to devices able to be linked to such a network and comprising means for implementing the process.

The invention applies in particular in a home network adapted to the interconnecting of audio and video devices.

(2) Related Art

In a network of mass-market electronic devices such as televisions, cable or satellite decoders or video recorders, it is necessary to provide means of communication between the devices, whilst taking account of the complexity and price constraints inherent in mass-produced devices.

Depending upon the type of network envisaged, it may be necessary for a device (also referred to as a node in what follows) of the network to ascertain the access path or the address of another device. This is also the case if the concept of device is replaced with the concept of object, or of software module, it being possible for a device to contain a large number of objects. This may relate to downloaded or resident applications, particular user interfaces or lower level modules. Each object or module of a device may seek to communicate with another object or module of the same device or of another device of the network. Each object is regarded as a resource available to other objects.

In this case, the problem arises of obtaining one or the dynamic list of resources available in the network.

SUMMARY OF THE INVENTION

In this context, the subject of the invention is a process for the distributed management of a catalogue of objects in a communication network comprising devices, the process comprising the step of registering local objects present in a device in a local registry managed at the level of this device, the process being characterized in that it furthermore comprises the steps:

of formulating, by a local object, a request for a list of objects, the request being transmitted to the single local registry of the device hosting the local object;

of propagating the request through the local registry to distant registries;

of collecting the responses to the request by the distant registries and the response of the local registry;

of transmitting the responses collected to the local object having formulated the initial request.

Each node (or device) stores only the information local to this node or device: the information is not duplicated in other nodes, an object registering itself only at the local registry. Thus, the memory requirements in each device are restricted.

The search for objects (software modules) is distributed amongst several devices, each database being interrogated at local level. Thus, the requirements for resources for processing the information at local level are themselves also restricted. Moreover, only the relevant information, that is to say that which meets the search criteria, travels over the network: the passband is therefore used wisely.

The consistency of the data is maintained in a simple manner: it is not necessary to update, by virtue of complex processing, distant databases when a change is made in a local database.

If a node disappears, only the information related to this node is lost.

Also, the requests are propagated in the network only to the other registries. There is no transmission to ALL the elements in the network, only to a well-identified subset, namely the registries. This also limits the passband required.

According to a particular embodiment, a local registry comprises for each object registered therein an identifier of this object in the network, this identifier being unique for the network, as well as attributes of the object.

According to a particular embodiment, the identifier (SEID) comprises an identifier of the device in which the object is present, this device identifier being unique in the network, as well as of a local identifier unique to this object at the level of the device.

According to a particular embodiment, a type of request formulated by an object is a request comprising at least one selection criterion pertaining to an object attribute.

According to a particular embodiment, the function of an object is an attribute stored by a local registry in respect of the object.

According to a particular embodiment, the step of propagating a request comprises the step of determining the devices connected to the network which themselves comprise a registry.

An object may thus initiate a request to obtain a list of other objects without concerning itself with knowing whether these objects are or are not located in the same node.

According to a particular embodiment, the step of determining the devices comprises the determination of the types (FAV, IAV, BAV, LAV) of the devices present in the network, the type of a device indicating whether it hosts a registry or whether it does not host one.

In a HAVi type network, the FAV and IAV type devices are obliged to comprise a registry, whilst the BAV and LAV type devices do not possess one.

According to a variant embodiment, a request is propagated only to a specified group of distant registries.

When it is known for example in advance that software modules comprising certain attributes are present only in a given type of device, then it is possible to limit the propagation of requests to this type of device so as to limit the number of messages flowing around the network.

According to a variant embodiment, one of the types of request which can be formulated by an object is a request comprising selection criteria for at least two lists of objects, as well as at least one operator for processing the lists.

The subject of the invention is also a device in a communication network comprising means for storing local objects, means for storing a local registry for containing a catalogue of objects local to the device, means for connecting the device to the network, the device being characterized in that furthermore comprises:

means for propagating a request for a list of objects formulated by a local object to the local registries of other devices;

means for collecting the responses of the registries of the other devices and the response of the local registry and for transmitting the responses of the object having formulated the request.

According to a particular embodiment, the device furthermore comprises means for determining the addresses of devices of the network comprising so-called distant registries.

BRIEF DESCRIPTION OF THE DRAWINGS

Other characteristics and advantages of the invention will become apparent through the description of a particular non-limiting embodiment illustrated by the appended figures, among which.

DETAILED DESCRIPTION OF THE INVENTION

According to the present exemplary embodiment, the home network comprises four types of devices: audio-video devices possessing full functionalities (FAV), audio-video devices with an intermediate function (IAV), base audio-video devices (BAV) and legacy audio-video devices (LAV). The communication bus is of the IEEE 1394 type, but may be of some other type. The network admits a common control language, referred to as the HAVI language.

The FAV type devices possess the most complete functionalities of all the devices of the network: a communication manager, a registry module, a device control module manager and device control modules (referred to as "DCMs" in what follows), it being possible for the latter to be downloaded. According to a variant, the device also comprises a user interface manager. The FAV devices can take control of less sophisticated devices, such as BAV and LAV type devices by way of device control modules. An FAV device can access other FAV or IAV type devices in order to access resources which it lacks (for example a user interface manager).

The IAV type device possess the same functionalities as an FAV except for the possibility of downloading the device control modules.

The BAV type device possess a private control language specific to them, and which is not necessarily the one used by the remainder of the devices. This type of device is controlled by an FAV device by way of a control module (DCM) downloaded from the BAV type device itself and adapted for the control thereof, for example the BAV type device can be a printer, whose print manager is downloaded.

The LAV type devices are devices connected to the bus or to IAV or FAV type devices by way of specific connections. The LAV type devices are controlled by specific control modules (DCM) which do not originate from the device itself and possess their own private language.

Figure 1A:
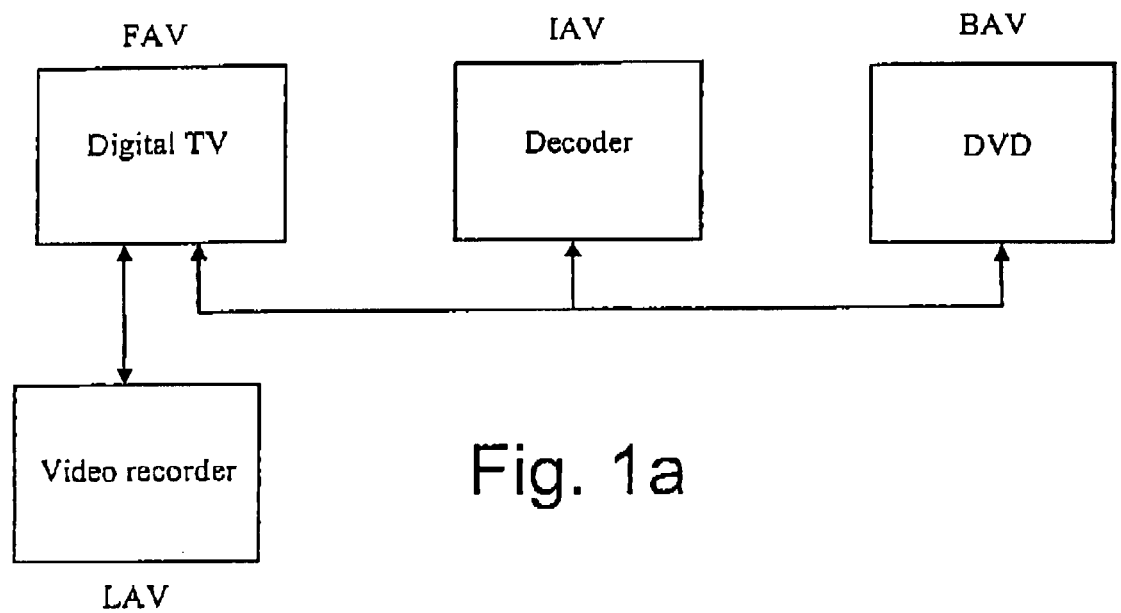
FIG. 1a schematically represents a home network comprising four devices of different types.

FIG. 1a represents an exemplary network in the form of four devices FAV, IAV, BAV and LAV. The FAV, IAV and BAV devices are connected to the same bus whilst the LAV device is connected directly to the FAV device and controlled by a control module present in the latter. The BAV device is controlled, for example, by way of the IAV device.

Figure 1B:
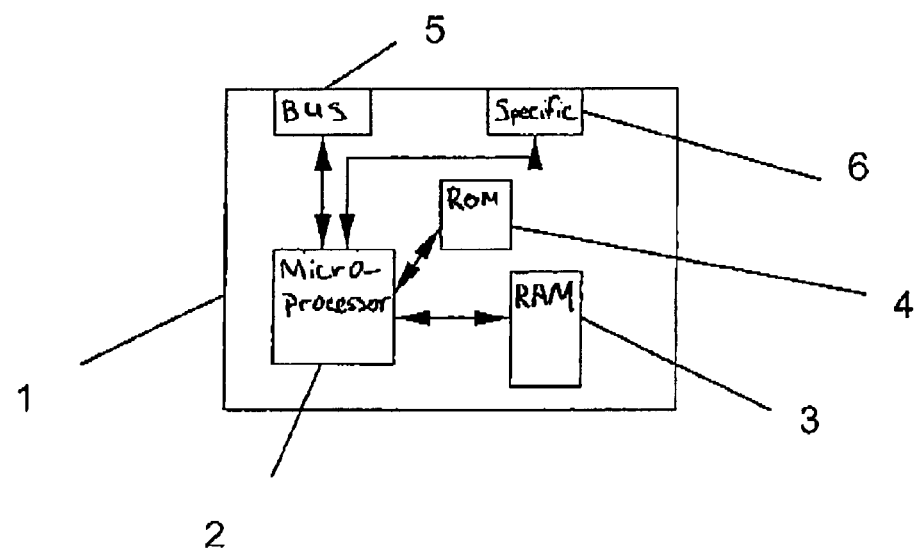
FIG. 1b is a block diagram of one of the devices of FIG. 1.

FIG. 1b schematically represents the FAV device 1. It comprises a microprocessor 2 linked to a random access memory 3 and an at least partially reprogrammable read-only memory 4, as well as an IEEE 1394 bus interface (reference 5) consisting of a link circuit and of a physical circuit ('PHY' according to the IEEE 1394 terminology). The device 1 also comprises a specific interface 6 for plugging in the LAV video recorder.

In particular four types of software modules may be present in the memory of the devices of the present network. These are DCM device control modules, applications, service modules and a message transmission manager.

The DCM device control modules allow the control of a device or of a subset of this device. The control module can be located in the device to be controlled itself (if it is an IAV or FAV type device) or in a device other than the device to be controlled (if the device to be controlled is of LAV or BAV type, the control manager will be located in an IAV or FAV type device, the latter serving as execution platform). A control manager is either present right from the outset, or can be downloaded. In the latter case, the downloading is carried out for example at the moment of initialization of the device, or when requested by an application.

The function control modules (referred to as FCSMs) are software modules allowing control of a function of a device and are included in the DCM device control modules. An device can in this regard possess several functions: recording, tuner, camera, display, mass memory, etc.

The service modules offer system services or functions. They can be accessed either by local software modules, or through the system for transmitting messages to modules of other devices. These system services or functions comprise in particular the graphical management of user interfaces, the management (for example the downloading) of the DCM modules, the procedures for connecting a device to the network, the initializing of the network, (listing of the network resources), as well as the registry module, which will be seen in greater detail hereinbelow.

Each software module (DCM or application or system services modules) must register itself at the local registry module (that is to say the registry module in which it resides or into which it has been loaded) if it wishes to grant access through the message layer to other software modules of the network. The FCM function modules related to a DCM control module also register themselves at the local registry module.

The message transmission managers are responsible for communicating messages from one software module to another, regardless of the devices in which these modules are located. When a software module wants to send a message to another module, it does not know the physical device which hosts the destination module.

Figure 2:
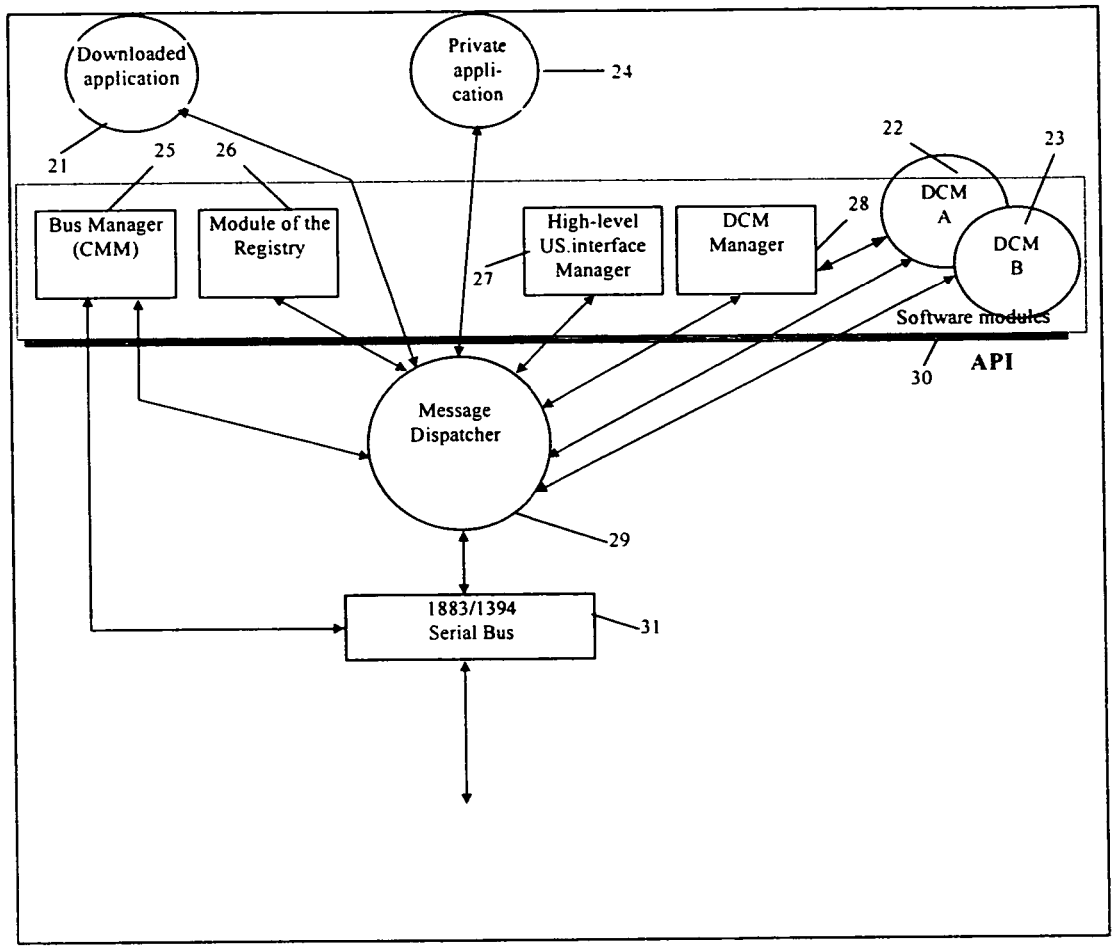
FIG. 2 is a schematic illustrating the software organization of the device of FIG. 1b.

FIG. 2 illustrates an example of a software organisation of an FAV type device.

This device comprises a downloaded application 21 (for example a game), two DCM control modules A and B 22 and 23, a private application 24 (for example an electronic program guide), an IEEE 1883/1394 type communication bus manager 25, a registry module 26, a high-level user interface 27, a DCM manager 28 and a message transmission system 29. The modules communicate with one another by way of the message transmission system accessible through an application programming interface 30 (referred to as the 'API' in what follows). The device also comprises an interface 31 with the 1394 bus.

Upon its installation into the network, the FAV device will seek to load the DCM control modules of BAV type devices with the aim of making them available to the applications. With this in mind, the BAV devices place the code of the corresponding DCM module into a known area of their memory and in a self-descriptive data structure referred to as the SDD (SDD standing for "Self Describing Device") The FAV type device can thus read this memory space and load the DCM module of the BAV type of device. An example is that where the BAV device is a printer. The DCM control modules thus loaded are registered in the module of the registry of the FAV device and thus accessible by the remainder of the network.

An SDD type data structure is obligatory in FAV, IAV or BAV type devices, and is situated at a fixed address in each device. On initialization thereof, it thus becomes possible for an FAV type device to explore the network so as to load the DCM modules of all the BAV type devices. It is the manager of DCM modules of the FAV device which executes this task.

An SDD data structure also comprises the device type (FAV, IAV, BAV, LAV).

The message transmission system of an device comprises:
  the module 26 of the registry (declaration and search for software modules),
  a message layer, comprising the message dispatcher 29 (sending and receiving of messages), the application programming interface (API) 30 for allowing access to the transmission system and an IEEE 1394 bus adaptation sub-layer.

The IEEE 1394 bus adaptation sub-layer has in particular the role of adapting the transmission of data to the IEEE 1394 protocol, by encapsulating the messages to be transmitted into packets adapted to the IEEE 1394 standard.

A message comprises three components: the address of the destination software module, the address of the source software module and useful data.

An address of a software module is composed of an identifier of the node on which it is executed, this identifier being unique to the network, followed by a software module identifier unique to the node in which it is executed. The identifiers of the software modules are allocated by the message transmission system local to a node. The addresses are used by the message dispatcher for forwarding messages to the appropriate software module. According to the present exemplary embodiment, a software module address or identifier (referenced "SEID" in what follows) is an 80-bit binary word. It comprises:
  a 64-bit device identifier stored in the ROM of the device in which the software module is executed. In the case of a downloaded module, it is the identifier of the host which is used. The device identifier is allocated at the time of manufacture and corresponds to the EUI64 field defined in the IEEE 1394—1995 standard. A part of this device identifier is administered by the IEEE organization and is specific to each manufacturer, the other is chosen by the manufacturer of the device himself, in such a way that each device manufactured is provided with a different identifier;
  a local identifier consisting of a serial number allocated directly by the message transmission system of a node, this number being coded on 16 bits and concatenated with the device identifier to form the SEID identifier. The message transmission system maintains a counter in this regard. A few serial numbers are reserved (for example from 0x0000 to 0x0005) and used to define particular service modules. For example, the serial number 0x0001 corresponds routinely to the module of the registry of an device.

Thus, each software module of the network comprises a distinct and unique SEID identifier. It is however possible to define unique identifiers by means other than those indicated hereinabove.

The module of the registry maintains a database comprising a directory of the software modules available locally at the device level. It makes available a programming interface which provides access to the functions of software module registration and module searching according to a list of criteria.

There is a module of the registry in each FAV or IAV type device. Inside such an device, all the software modules are registered by the module of the local registry. If a software module wishes to be able to be concatenated, it must register itself at the module of the registry. For each software module registered therein, the module of the registry maintains the address thereof in the network and the attributes of this module.

According to a variant embodiment, the module of the registry comprises not the address of the software module, but its serial number.

The attributes of a software module enable it to be characterized. For each software module, these attributes are stored in a table, comprising for each attribute the reference of the latter on 32 bits, its size in bytes, as well as its value.

Table 1 gives a list of predetermined attributes:

TABLE 1

| Attribute reference | Format of the type | Size | Presence |
| --- | --- | --- | --- |
| Type of software module | integer | 32 bits | M |
| HUID identifier | string of bytes | 80 bits | M* |
| Type of device | integer | 32 bits | M* |
| Graphical interface | integer | 32 bits | Y |
| Support format | bit field | 32 bits | Y |
| Data format | bit field | 32 bits | Y |
| Device manufacturer | character string | 15 bytes | M* |
| Software module manufacturer | character string | 15 bytes | Y |
| Software module version | character string | 15 bytes | Y |
| Audio/video control language | bit field | 32 bits | Y |

The software module type represents the prime function of the module. If the software module is a system service module, then the type of the attribute designates the system service itself. The module of the registry is such a service module. If the software module is an FCM, function control manager, the type defines the function: recorder, display, tuner, etc. If the software module is a DCM device control manager, the type is "DCM". If the software module possesses an application programming interface ("API") which is incompatible with the remainder of the network, then the type is "Private".

The "HUID" identifier is an identifier of the device with which a DCM manager is associated or of a function with which an FCM manager is associated.

The device type associated with the software module is FAV, IAV, BAV or LAV, is already explained.

A DCM manager can be associated with a graphical user interface. The attribute "graphical interface" indicates that this is the case, and what as appropriate is the degree of compatibility of the interface of the DCM manager with the various interface levels provided in the network.

The attribute "support format" indicates the type of data storage support which is supported by a device. These are for example DVD, DAT, DVHS, DVC supports.

The attribute "data format" indicates the format of data which can be manipulated by a device. These are for example MPEG2, JPEG, MIDI, ASCII formats.

The attributes "device manufacturer" and "software module manufacturer" indicate a reference respectively of the manufacturer of the device or of the software module whilst the attribute "software module version" indicates the version number of a module.

Lastly, the attribute "audio/video command language" indicates the type of languages specific to the software module, in addition to the common HAVI command language already mentioned. The value of the attribute is a 32-bit field, the value of each bit indicating compatibility with a specific command language, for example CAL or AV/C.

The database of a registry module can, according to a variant embodiment, also comprises specific or "private" attributes.

It should be noted that the modules of the registries of various devices are distinct. There is no centralized registry, in which all the software modules would be catalogued. The software modules are registered only at the level of a single registry: their local registry. There is therefore no double registration at several registries.

According to the present exemplary embodiment, the application programming interface of a module of the registry comprises five commands, which will be detailed hereinbelow:

(a) Software module registration

This command is used to add a software module to the database of the local registry or to modify the attributes of a software module already registered. It is used in particular by a software module to register itself when the device comprising this element is plugged in.

The software module transmits its SEID identifier and the attributes to the module of the registry. If this identifier is already present, the new attributes replace the old ones. Otherwise, a new entry is created in the local database (local registry). The module of the registry transmits a status message to the software module, depending on the result of the recording: confirmation of recording or error message.

(b) Software module extraction

This command is used to read the attributes of a software module, knowing its SEID identifier. A pointer to an area of the random access memory of the device, to which area the data must be copied, is transmitted with the extraction request. If the software module is not present in the local database, then the pointer is set to zero and returned by the module of the registry.

The module of the registry also returns a status message, which confirms the copying of the attributes, or indicates that the sought-after identifier is not present.

(c) Erase a software module from the registry

This command is used to eliminate a software module from the local database. Its SEID identifier is supplied as command parameter. The module of the registry returns a status message confirming the deletion or indicating that the corresponding software module has not been found.

(d) Request the list of software modules ("Simple request")

This command makes it possible to determine the identifiers of software modules registered in the set of local registers and meeting certain criteria. According to the present exemplary embodiment, these criteria are the reference of an attribute and the value of an attribute. A parameter of the command is also an operator indicating the way in which the comparison between the value of the attribute specified in the command and the values of the base is to be made (equal, larger, larger or equal, smaller, smaller or equal, different, bitwise logical "AND", bitwise logical "OR", etc.).

The module of the registry returns as appropriate the list of SEID identifiers of the corresponding software modules. It also returns a status message indicating the success of the operation (whether or not identifiers have been found), or its failure.

(e) Perform a boolean operation between two lists of software modules ("multiple request")

This command is used to perform a boolean operation on two lists of identifiers. The command comprises as parameters the requests corresponding to each list. A request can consist of the criteria already mentioned in paragraph (d) (simple request), or of another multiple request.

A parameter of this command is also the relevant boolean operator ("AND" or "OR" when the context of the present exemplary embodiment).

The module of the registry returns as appropriate the list of SEID identifiers as well as a status message informing of the success of the operation or its failure, for any reason whatsoever, such as for example a shortage of resources.

To access other software modules, a software module must know the SEID identifier of its corresponding modules. As regards software modules registered in the same module of the registry, this is not a problem, the requests set out above enabling each software module to extract lists of identifiers from the local database.

A software module accesses the module of the local registry through the local message transmission system. It can also access a distant registry module, and thus send back identifiers of modules registered at other registry modules. To do this, each registry module propagates a request which has been transmitted to it locally to the modules of the registries of all the other devices. According to the present exemplary embodiment, a distant registry module from which no response is received in a given time interval is ignored.

Each module of the registry receiving the request of the module of the initial registry performs its own search in its local database and returns as appropriate separately the lists of identifiers corresponding to the criteria of the request to the module of the initial registry. The latter then transmits the concatenated list of all the identifiers received to the software module which initiated the request. The software module which initiated the request can then communicate with the software modules of the other devices and use the resources corresponding to them.

Figure 3:
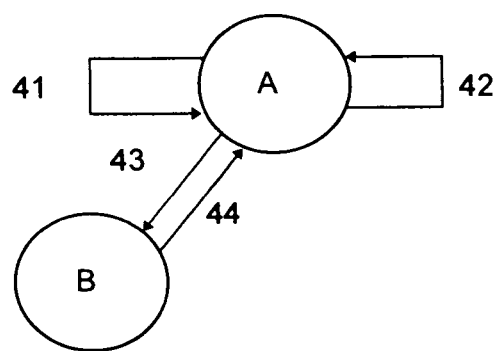
FIG. 3 represents the states of a registry module of a device of the network.

FIG. 3 is a state diagram of a module of the registry of a device. This diagram comprises two states, A and B. State A is a state awaiting a request of a software module. State B is the state awaiting a response to a request made of the modules of distant registries by the module of the local registry.

Table 2 gives the events triggering actions undertaken by the module of the local registry and the corresponding starting and finishing states. The references of the events are the same as in FIG. 4.

| Event | Meaning | Action | Starting state | Finishing state |
|---|---|---|---|---|
| 41 | Registration or extraction or erasure of a software module of the base | Determine and transmit response | A | A |
| 42 | Request for a 'simple' or 'multiple' list received from a distant registry module. | Determine and transmit response | A | A |

-continued

| Event | Meaning | Action | Starting state | Finishing state |
|---|---|---|---|---|
| 43 | Request for a 'simple' or 'multiple' list received from a local software module. | Determine response for local base and transmit request to the modules of distant registries | A | B |
| 44 | All the responses have been received | Determine and transmit final response to the local software module | B | A |

The requests are propagated by the registry module. It should be recalled that the identifier of a registry module is composed of a manufacturer identifier (fixed by IEEE), a device identifier (fixed by the manufacturer) and of a registry module identifier, the latter being identical for all the registry modules.

To be able to propagate a request, the registry module of a device enrols all the devices of the network, whose identifiers it obtains. It then determines those among these devices which also comprise a registry. In the present exemplary embodiment, these are only FAV or IAV type devices. Knowing the identifiers of the devices which can be accessed by the network, the module of the registry reads the type of each device in the SDD data structure mentioned above. It thus eliminates the BAV type devices. The concatenation of each device identifier with the local identifier (serial number) fixes common to all the registry modules to obtain the list of complete SEID addresses of all the registry modules. A registry module obtains the list of device identifiers by way of the local bus management module (the so-called "CMM"), which monitors the connecting and disconnecting of network devices. This module reads the list of all the nodes connected to the network from a registry referred to as "TOPOLOGY_MAP" defined by the IEEE 1394—1995 document, paragraph 8.3.2.4.1. This registry is situated in a bus manager device (referred to as the "Bus Manager" in the abovecited IEEE document) which updates the registry relating to the topology of the network. The address of this device is known by the other devices by means also described in the IEEE document.

Figure 4:
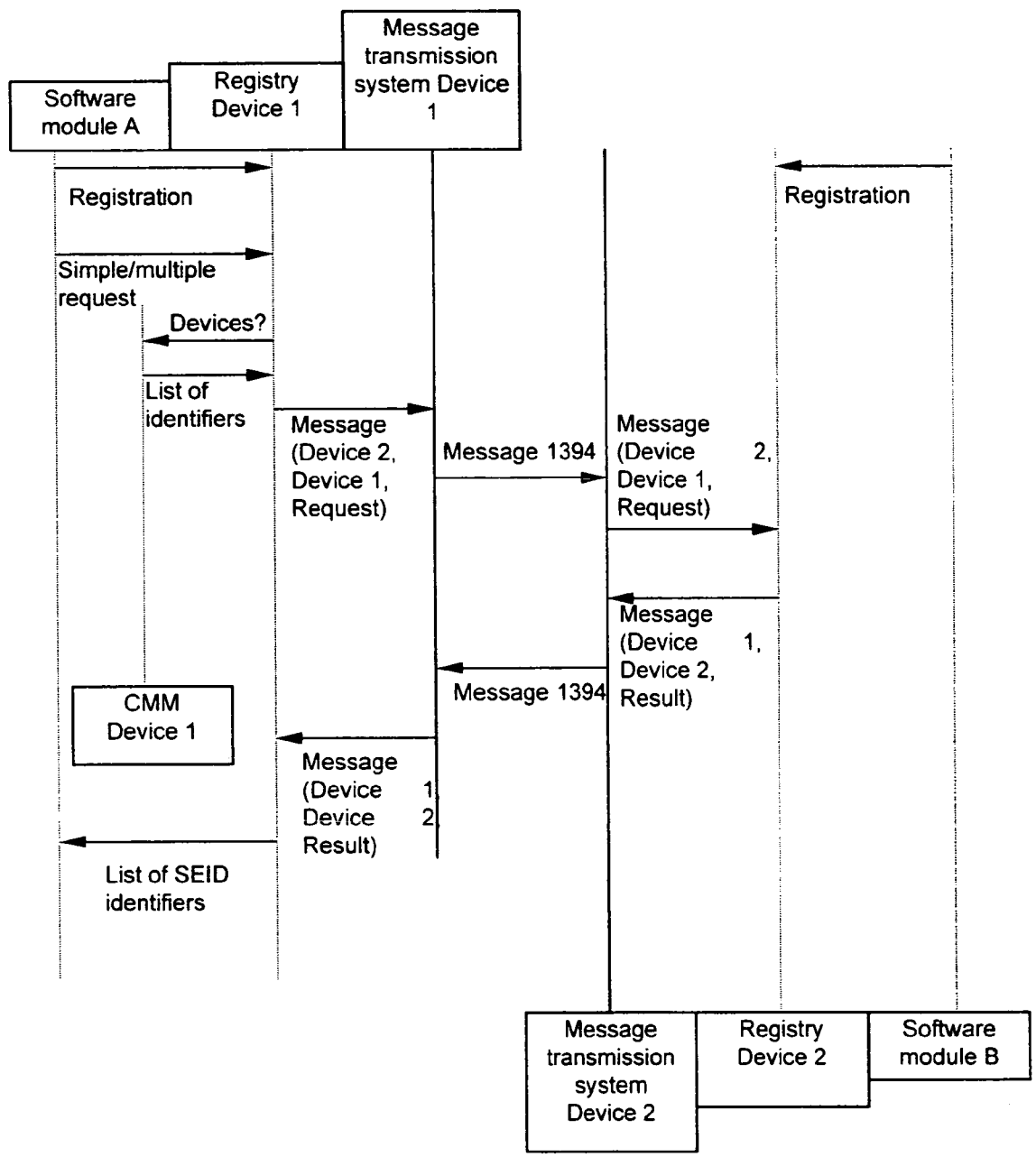
FIG. 4 represents the sequencing of the messages upon a request requiring propagation to a distant registry module.

FIG. 4 is a diagram indicating the sequencing of the messages when a request issued by a software module A of a first device is to be propagated to the registry module of a second device, a software module B being registered in the registry of this second device.

According to the embodiment presented hereinabove, a request issued by a software module with a view to determine the set of non-local software modules is propagated to all the distant registry modules. According to a variant embodiment, this type of request can also be limited to a group of distant registry modules, for example those of a particular device type.

The invention claimed is:

1. A method for distributed management of a plurality of resources in a communication network comprising devices, the method comprising the steps of:
   registering local resources hosted by a device only in a local registry managed by the device;
   sending a request for a list of resources from a local resource to the local registry of the device hosting the local resource;
   propagating the request through the local registry to local registries of other devices;
   collecting responses to the request by the local registries of said other devices and a response of the local registry; and
   transmitting the responses collected to the local resource which sent the request.

2. The method according to claim 1, wherein a local registry comprises for each resource registered therein an identifier of the resource in the network, the identifier being unique for the communication network, as well as attributes of the resource.

3. The method according to claim 2, wherein the identifier comprises an identifier of the device in which the resource is present, the device identifier being unique in the communication network, as well as of a local identifier unique to the resource at the level of the device.

4. The method according to claim 2, wherein a type of request formulated by resource is a request comprising at least one selection criterion pertaining to resource attribute.

5. The method according to claim 4, wherein a function of resource is an attribute stored by the local registry in respect of the resource.

6. The method according to claim 1, wherein the step of propagating the request comprises the step of determining the devices connected to the network which themselves comprise a registry.

7. The method according to claim 6, wherein the step of determining the devices comprises the determination of the types of the devices present in the network, the type of a device indicating whether it hosts a registry or whether it does not host one.

8. The method according to claim 1, wherein a type of request formulated by resource is a request comprising selection criteria for at least two lists of objects, as well as at least one operator for processing the lists.

9. A device in a communication network comprising:
   memory for storing local resources;
   means for storing a local registry for containing a list of resources local to the device;
   means for connecting the device to the communication network;
   means for propagating a request for a list of resources sent by a local resource to local registries of other devices; and
   means for collecting responses of the local registries of the other devices and a response of the local registry and for transmitting the responses to the resource having sent the request.

10. The device according to claim 9, further comprising means for determining the addresses of said other devices of the communication network comprising registries.

* * * * *